Aug. 4, 1925.

H. N. WYLIE

WING OR THE LIKE FOR AIRCRAFT

Filed Nov. 21, 1923

1,548,403

2 Sheets-Sheet 1

Inventor
Hamilton Neil Wylie

Aug. 4, 1925. 1,548,403
H. N. WYLIE
WING OR THE LIKE FOR AIRCRAFT
Filed Nov. 21, 1923 2 Sheets-Sheet 2

Patented Aug. 4, 1925.

1,548,403

UNITED STATES PATENT OFFICE.

HAMILTON NEIL WYLIE, OF COVENTRY, ENGLAND, ASSIGNOR TO ARMSTRONG SIDDELEY MOTORS LIMITED, OF PARK SIDE, COVENTRY, ENGLAND.

WING OR THE LIKE FOR AIRCRAFT.

Application filed November 21, 1923. Serial No. 676,133.

*To all whom it may concern:*

Be it known that I, HAMILTON NEIL WYLIE, a subject of the King of England, residing at Coventry, in the county of Warwick, England, have invented certain new and useful Improvements in Wings or the like for Aircraft, of which the following is a specification.

This invention relates to aeroplane wings and like structures, in which the surface material of the wing is borne by transverse members or ribs supported upon longitudinal members or spars, and it is particularly, but not exclusively, applicable to such structures in which the spars are made of metal.

The main object of the invention is to provide a method of attaching the ribs to the load supporting spars in such a way as to avoid the necessity of positive attachment of the ribs to the spars, which is usually effected by means of rivets or bolts passing through the spar, or by welding or the like to the spar. All of these tend to weaken the spar, particularly when effected during assembly of the wing or the like when the parts are accessible only to portable apparatus to effect the required joints.

A further object of the invention is to provide a form of connection which shall assist to counteract the tendency of the spar to collapse under the forces to which it is subjected, a tendency to which hollow metal spars are, by their nature, liable. A still further object is to provide a method ensuring quick and easy assembly and dismantling.

The invention consists broadly in attaching a rib to a spar by means of a clamping device secured to the rib and engaging the spar by clamping action and without the use of bolts or rivets passing through the spar or by welding or the like to the spar.

Preferably for this purpose the spar is located between abutments on the rib, which fit into longitudinal grooves in the spar or fit round projecting parts on the spar, and the abutments are so adjusted on the rib as to engage the spar by pressure only. Two of these abutments, therefore, constitute a clamping device.

The abutments are preferably so shaped and applied to the spar that they resist the tendency of the spar to collapse by its becoming shallower and wider.

It is preferred that one or all of the abutments be movably mounted on the rib before assembly, so as to facilitate the process of assembly, which is completed by bringing into place and fixing the movable abutment, or abutments.

Figure 1:
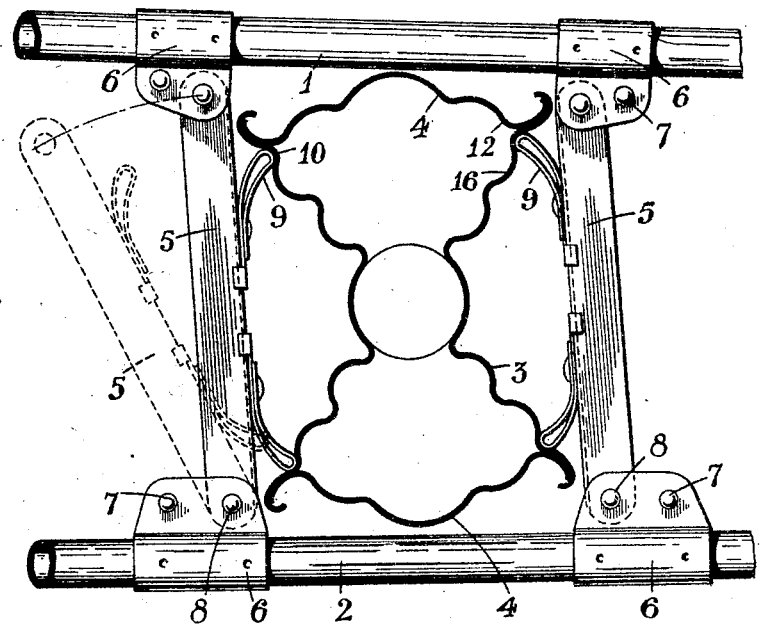
Figure 2:
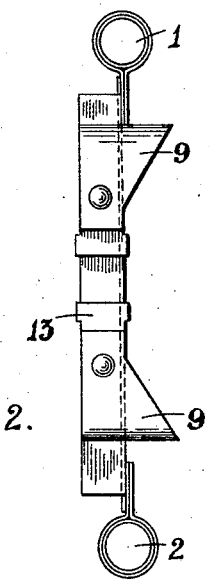

The accompanying drawings illustrate the method of carrying out the invention. In these, Figure 1 shows a portion of an aeroplane wing structure with the main spar or girder shown in cross section, and having longitudinally corrugated sides, Figure 2 is an end view of Figure 1 omitting the spar, Figure 3, in a view similar to Figure 1, shows a modification, and Figure 4 shows a further modification in which a spar of plain hollow circular section is employed.

Like letters indicate like parts throughout the drawings.

In the construction illustrated in the accompanying drawings, the rib is made, as usual, with upper and lower booms 1 and 2 which are preferably so spaced that when mounted upon the spar 3 they have a slight clearance from the upper and lower faces 4 thereof. In order to secure the rib transversely on the spar, there is positively attached to the rib a clamping device which engages the spar by clamping action only. This clamping device may vary in form but is preferably constructed as follows:—

At each side of the spar there is provided on the rib an abutment or abutments mounted on or carried by a strut 5 which is disposed between, and secured to, the two booms 1 and 2, the abutments being arranged on either side of the spar. If desired, the struts may be so spaced and adjusted on the booms as themselves to engage, with a clamping action, the sides of the spar 3 and thereby locate the rib upon it. This is clearly shown in Figure 3 in which the edges 11 of the struts 5 are shaped to fit the sides of the spar and to bear against them. On the right side of the drawing they are shown as closely fitting the corrugations of the spar, while on the left side they bear mainly on the crests thereof. This strut, therefore, can be swung into and out of engagement with the spar as is hereunder described.

Preferably, however, each strut is provided with any suitable projection or the like either integral with or secured to the strut and shaped and positioned to engage effectively the spar.

Where longitudinally corrugated and sinuously curved spars are employed, there is preferably attached to each abutment member 5 (preferably two) intermediate resilient engaging abutments (it being preferable to employ four of these at each point of attachment of a rib to a spar) so arranged as to engage the spar at convenient points close to the junction of the flange and the web portions of the spar.

Various methods of arranging and securing the struts 5 and the intermediate abutments may be used, depending upon the particular circumstances of each case.

In the construction illustrated, the abutments are upon angular section struts secured to the booms by means of clips 6 which are adapted to be drawn together round the booms by means of bolts, rivets, or the like, indicated at 7, the abutment members 5 being in turn secured to the clips by means of rivets or the like 8. The abutments are formed by a folded strip 9 of spring steel or the like, these strips preferably being so bent that the fold 10 forms a curve adapted to fit and engage in the curved exterior angle formed by the web 16 and the flange 12 of the spar. The two ends of the strip 9 are drawn together and secured to the strut 5 by rivets or the like. It is preferable to provide the spring strips 9 with tongue pieces 13 adapted to be bent round and to engage the sides of the struts so that a single rivet will suffice to hold each strip. By this method of attachment it will be seen that the members 9 and struts 5 act as arches resisting the stresses which tend to collapse the strut and causing it to become shallower and wider. This not only ensures firm contact between the spar and the strut, but it also counteracts any tendency which the spar may have to deform either under the load applied to it by the rib which it supports, or due to any forces that arise within the spar itself. It is clear that the application of the load of the rib to the spar 3 will have a tendency to flatten out the curved top and bottom portions of the spar and compress the corrugated side portions of the spar, which would then collapse, but that this is counteracted by this method of applying the load to the spar.

Figure 3:
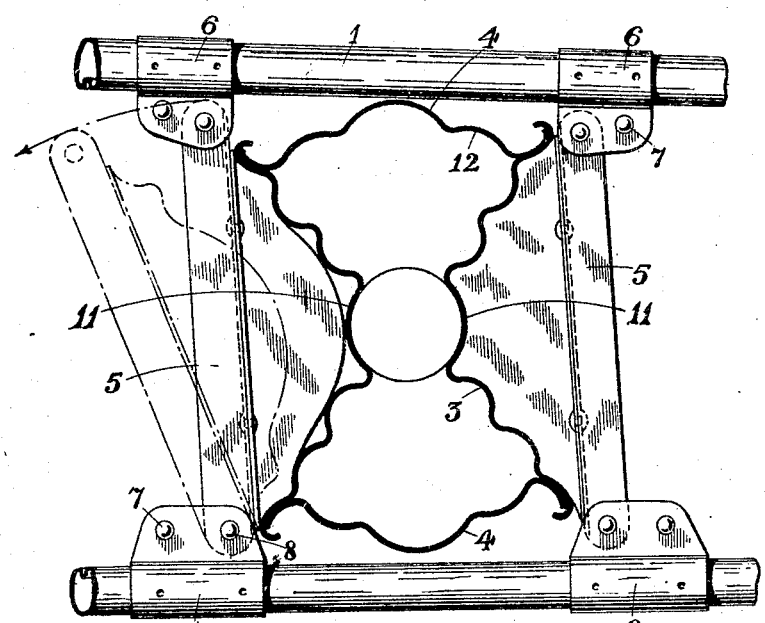
Figure 4:
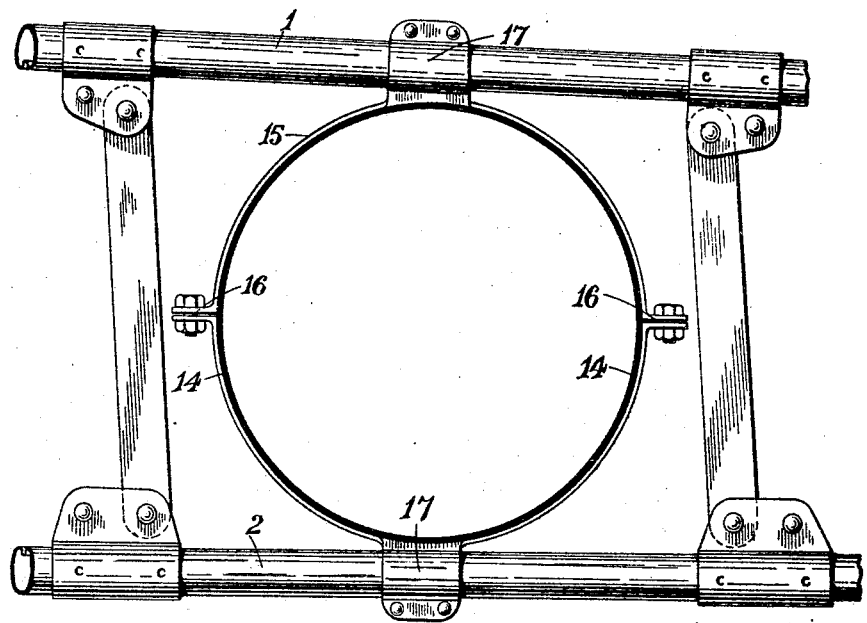

In assembling, it is generally convenient to complete the attachment of one of the struts 5 to both the booms 1 and 2, whilst the other strut is left secured at one end only, as is illustrated in dotted lines in Figures 1 and 3. The latter strut can then be swung outwards so as to clear any fittings, projections, or the like, which may be attached to the spar, or other parts, and, when the rib has been mounted in its correct position, the second strut 5 may be engaged with its clip 6, and then secured in the manner described. By this means the assembly of the whole structure is facilitated.

The rib is thus supported upon the spar by a clamping device, which is secured to and carried by the rib but has no positive connection with the spar, its engagement therewith being solely of a gripping or clamping nature, which in this construction is made effective by the abutments fitting into the longitudinal corrugations of the spar.

In some cases, instead of the abutments fitting into the grooves in the spar they may be so shaped as to fit round projections thereon such as the longitudinal ridges of the corrugations.

The method of locating the rib on the spar by means of resilient intermediate members such as 9 secured to the abutments has the further advantage that any slight variation in the shape or size of the parts is easily allowed for by the yielding of the resilient members when they are forced into place. Instead of using resilient members, brackets or other forms of intermediate engaging members or abutments may be employed, and these may be made integral with the struts 5 or secured thereto.

In most cases only one strut at each point of attachment requires to be movably attached to the rib, but both may be so attached if required.

Although the invention has been described with reference to longitudinally corrugated and sinuously curved spars, it is not limited to use with spars of this kind, it being one of the advantages of the present invention that it can be applied to ribs and spars of any desired shape or cross section, the particular shape, arrangement of the abutments, and the shape of the parts thereof which engage the spar being, of course, suitably varied according to the spar being used. As an example, Figure 4 shows a spar 14 of hollow circular section, and the clamp 15 which engages it is made in two parts united by fasteners at 16. Lugs 17 are provided for each part to secure it to the upper and lower booms 1 and 2.

What I claim as my invention and desire to secure by Letters Patent of the United States is:—

1. In an aeroplane wing or like structure, the combination of a spar, a rib supported thereon, and a clamping device secured to said rib and engaging said spar solely by clamping action exerted in a direction transverse to the load upon the spar, substantially as set forth.

2. In an aeroplane wing or like structure, the combination of a spar, a rib supported thereon, abutments upon said rib adapted to locate said spar between them, and means for adjusting said abutments relatively to one another to grip the sides of said spar in a direction transverse to the load upon the spar, substantially as set forth.

3. In an aeroplane wing or like structure, the combination of a spar, a rib supported thereon, abutments on said rib relatively adjustable to grip the sides of said spar, in a direction transverse to the load upon the spar, and means constituted by appropriate shaping of the spar and arrangement of the abutments adapted to resist the tendency of the spar to collapse by its becoming shallower and wider under load, substantially as set forth.

4. In an aeroplane wing or like structure, the combination of a spar, a rib supported thereon, a fixed abutment upon the rib, a movable abutment also upon the rib, and means for securing said movable abutment when said rib is in position so that the sides of said spar are gripped between the two abutments, in a direction transverse to the load upon the spar, substantially as set forth.

5. In an aeroplane wing or like structure, the combination of a spar, a rib supported thereon, and resilient abutments on the rib relatively adjustable to grip the sides of said spar and so formed as to exert a resilient pressure thereon, substantially as set forth.

6. In an aeroplane wing or like structure, the combination of a spar, a rib supported thereon, and spring abutments upon said rib adapted to engage said spar in such manner as to resist stresses tending to collapse it, substantially as set forth.

7. In an aeroplane wing or like structure, the combination of a spar, a rib composed of two members, one above and the other below said spar and supported thereon, struts connecting the two rib members and locating between them said spar, and bearing abutments which grip the sides of said spar, in a direction transverse to the load upon the spar, substantially as set forth.

8. In an aeroplane wing or like structure, the combination of a spar, a rib composed of two members one above and the other below said spar and supported thereon, struts connecting the two members of said rib, abutments upon said struts adapted to grip the sides of said spar, in a direction transverse to the load upon the spar, and means for displacing one of said struts initially to enable the parts to be assembled and means for fixing it in position after assembly, substantially as set forth.

9. In an aeroplane wing or like structure, the combination of a spar, a rib composed of two members one above and the other below said spar and supported thereon, struts connecting the two members of said rib, abutments upon said struts adapted to grip the sides of said spar, and means comprising a pivotal connection at the end of one strut to enable it to be swung aside initially for assembly of the parts, and a fastener for securing its free end after assembly, substantially as set forth.

10. In an aeroplane wing or like structure, the combination of a spar consisting of a girder with corrugated sides, a rib composed of two members one above and the other below the spar and supported thereon, struts connecting the upper and lower member of said rib, one of which struts is initially displaceable and adapted to be fixed to the rib members after assembly upon the spar, and bearing abutments adapted to engage the corrugations of the spar girder so as to resist collapsing stresses thereof, substantially as set forth.

11. In an aeroplane wing or like structure, the combination of a spar consisting of a girder with corrugated sides, a rib composed of two members one above and the other below the spar and supported thereon, struts connecting the upper and lower member of said rib, one of which struts is initially displaceable and adapted to be fixed to the rib members after assembly upon the spar, and bearing abutments formed of leaf springs attached to said struts and looped to contact with the corrugations of said spar, substantially as set forth.

In testimony whereof I affix my signature.

HAMILTON NEIL WYLIE.